United States Patent [19]

Haworth

[11] 4,235,400
[45] Nov. 25, 1980

[54] HI-LO TWO SPEED WING

[75] Inventor: Floy Haworth, Monett, Mo.

[73] Assignee: Juanita June Haworth, Monett, Mo.; a part interest

[21] Appl. No.: 27,102

[22] Filed: May 10, 1979

[51] Int. Cl.³ ............................ B64C 3/38; B64C 3/44
[52] U.S. Cl. .................................. 244/218; 244/219; 244/45 R; 244/46
[58] Field of Search .............. 244/213, 215, 216, 218, 244/219, 45 R, 46, 48, 123, 210

[56] References Cited

U.S. PATENT DOCUMENTS

| | | | |
|---|---|---|---|
| 1,457,955 | 6/1923 | Beadle | 244/219 |
| 1,870,119 | 8/1932 | Hughes | 244/48 |
| 2,743,887 | 5/1956 | Fiedler | 244/218 |
| 3,063,659 | 11/1962 | Szerda | 244/46 |
| 3,161,374 | 12/1964 | Allred et al. | 244/12.3 |
| 3,815,848 | 6/1974 | Alperin | 244/45 R |

FOREIGN PATENT DOCUMENTS

| | | | |
|---|---|---|---|
| 954086 | 12/1949 | France | 244/48 |
| 957054 | 2/1950 | France | 244/210 |

*Primary Examiner*—Galen L. Barefoot

[57] ABSTRACT

An upper and lower member are joined together near the tip. They are hinged near the front and back on the top member. This allows the wings to be opened for high speed, when cruising, and to be closed for take off and landing at a low speed. The exact size and shape of the moveable sections will be dictated by the size of the wing and the distance between the upper and lower wings where they join the fuselage. When the wing reaches a certain speed the drag forces will become more demanding creating a faster movement through the air passages causing a suction at the front of the wings. The ram affect on the front and the suction affect in the back will accomplish two things. It will dissipate the drag that tries to build up at the trailing edge and eliminate the pile up of air at the leading edges of the wing. The air passageways between the wings, when in the open position, will have to be the same size all of the way through the passageways. The Nacelle, which is extremely streamlined, could house the landing gear, but its main purpose in relation to the wing is to brace it and house part of the actuating mechanism for the moveable sections. It is not designed to mount an engine.

5 Claims, 9 Drawing Figures

HI-LO TWO SPEED WING

SUMMARY

The purpose of this invention is to allow an airplane built with my designed wing to take off at a fairly slow speed and then make changes while in flight, causing the wing to reach its peak efficiency at a very high speed, eliminating the high drag that usually accompanies a radical increase in speed. It would also eliminate the high consumption of fuel associated with drag. When open for cruise the resistance to forward movement through the air should be a great deal less than with conventional wings.

It will enable a manufacturer to build a plane that would travel at the speed he wanted it to and still land at a speed he wanted it to. It would be variable.

The lift obtained at a low speed would not depend on the built in lift of the wing when open for high speed. It would be decided by the distance between the top wing member at the fuselage. This would also determine the shape of the opening, which in turn would be hinged to move down and obtain a desireable configuration when closed for slow speed.

The exact size and shape of the moveable sections will be dictated by the size of the wing and distance between the upper and lower wings where they join the fuselage.

The opening and closing of the moveable sections must be synchronized to open and close gradually and smoothly away from icing conditions. Any venturi effects should be engineered out. The moveable sections should be well streamlined at the expense of a slightly rough low speed configuration.

The wings are short, broad and tapered.

DETAILED DESCRIPTION

Figure 1:
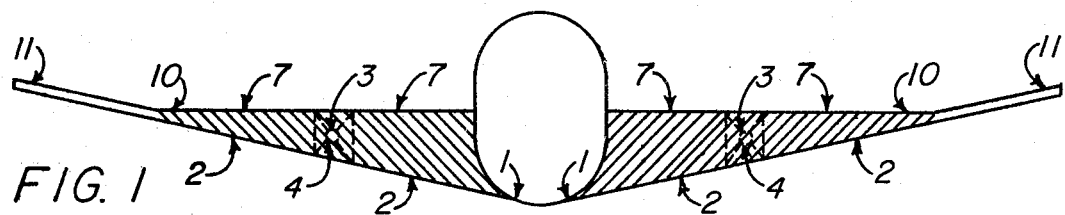
FIG. 1—The head-on view of the wings in a closed position for take-off or landing.

FIG. 1—The moveable section of the upper wing 2 in a closed position. The upper wings 2 and lower wing 6 connect at 10 to accomodate the wing tip 11.

The hinge line is shown at 7.

The leading edge 2 of the top wing is down against the leading edge of the bottom wing 6 making a high lift low speed wing.

Figure 2:
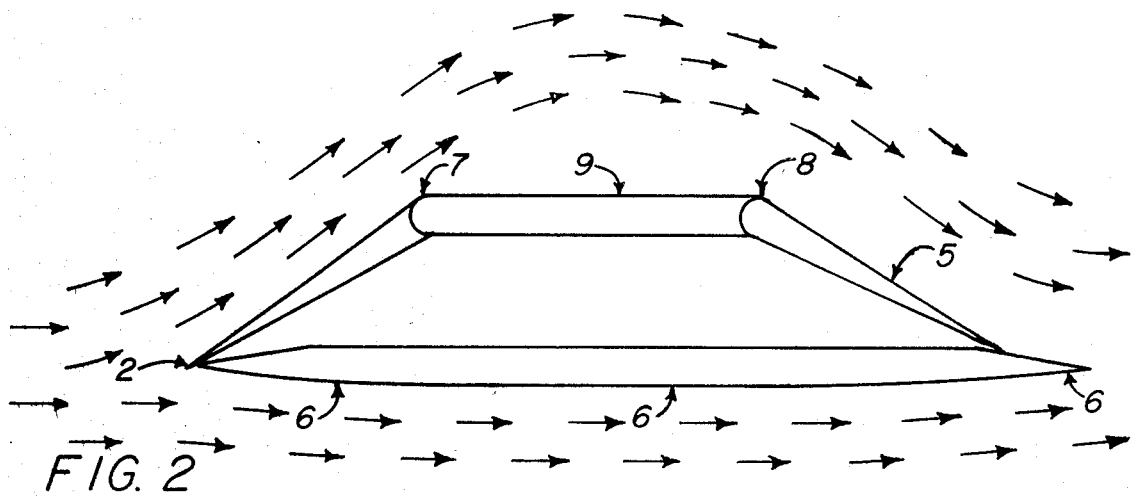
FIG. 2—The cross section of the wing when the wing is closed.

FIG. 2—Cross section of the top wing 9 when the moveable sections 2 and 5 are closed against the lower wing 6.

Hinges 7 and 8 are shown.

Figure 3:
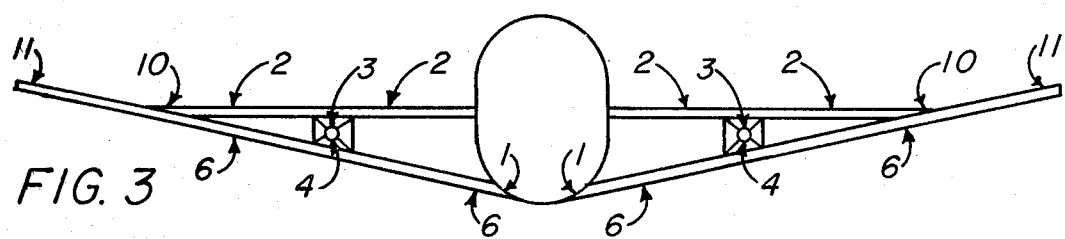
FIG. 3—The head on view of the wings open for cruise.

FIG. 3—The front view with the top wing 2 open in cruise position. The Nacelle 3, the wings connect at 10, the wing tips 11, the bottom wing 6, the housings for the actuating mechanisms 4 and 4.

Figure 4:
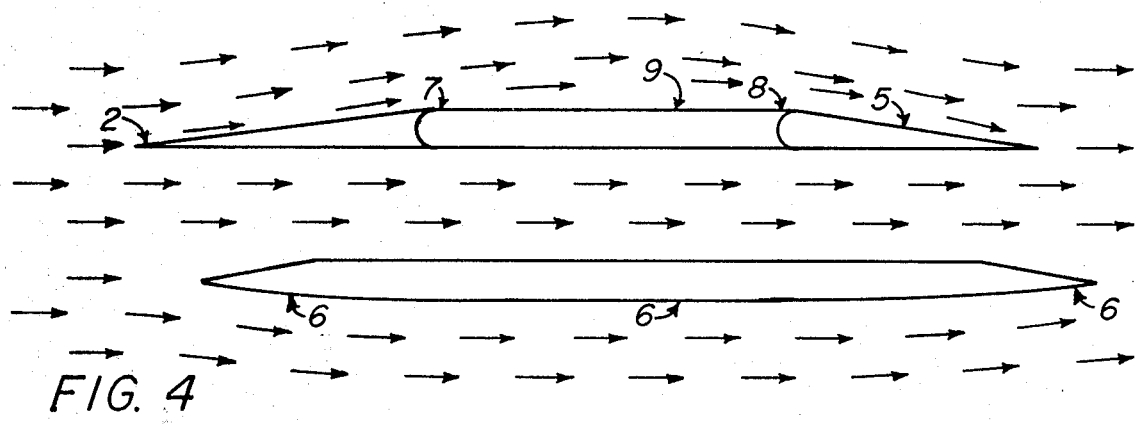
FIG. 4—The cross section of the wing with the moveable sections on the top member raised for cruise.

FIG. 4—The cross section of the top wing 9 with the moveable sections 2 and 5 raised in cruise position. When in cruise position the front top wing 2 is ahead of the bottom wing 6 at the fuselage tapering to an even edge where the wings converge at 10.

Figure 5:
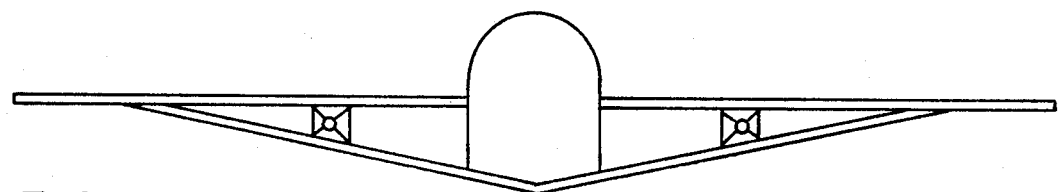
FIG. 5—A different variation of the wing.

FIG. 5—A different variation of the wings 2 and 6. When open all moveable parts are connected with the top wing.

Figure 6:
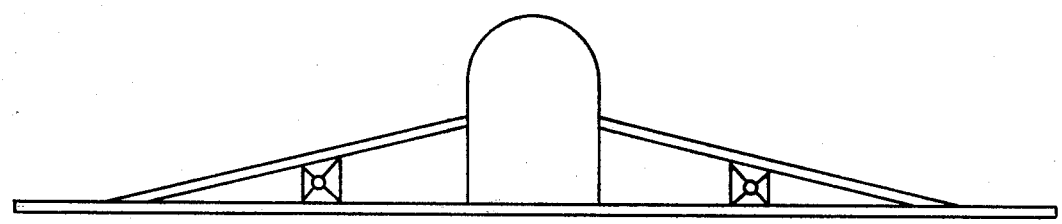
FIG. 6—A different variation of the wing.

FIG. 6—A different Variation of the wings 2 and 6. When open all moveable parts are connected with the top wing.

Figure 7:
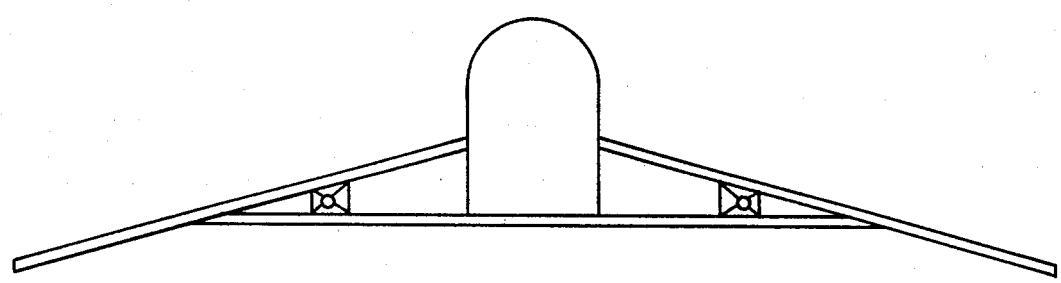
FIG. 7—A different variation of the wing.

FIG. 7—A different variation of the wings 2 and 6. All moveable parts are connected with the top wing.

Figure 8:
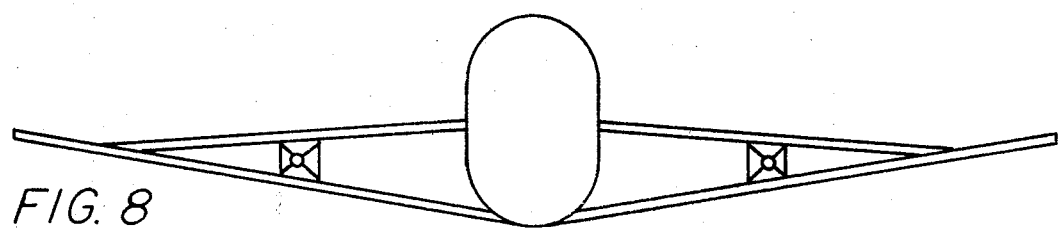
FIG. 8—A different variation of the wing.

FIG. 8—A different variation of the wings 2 and 6. All moveable parts are connected with the top wing.

Figure 9:
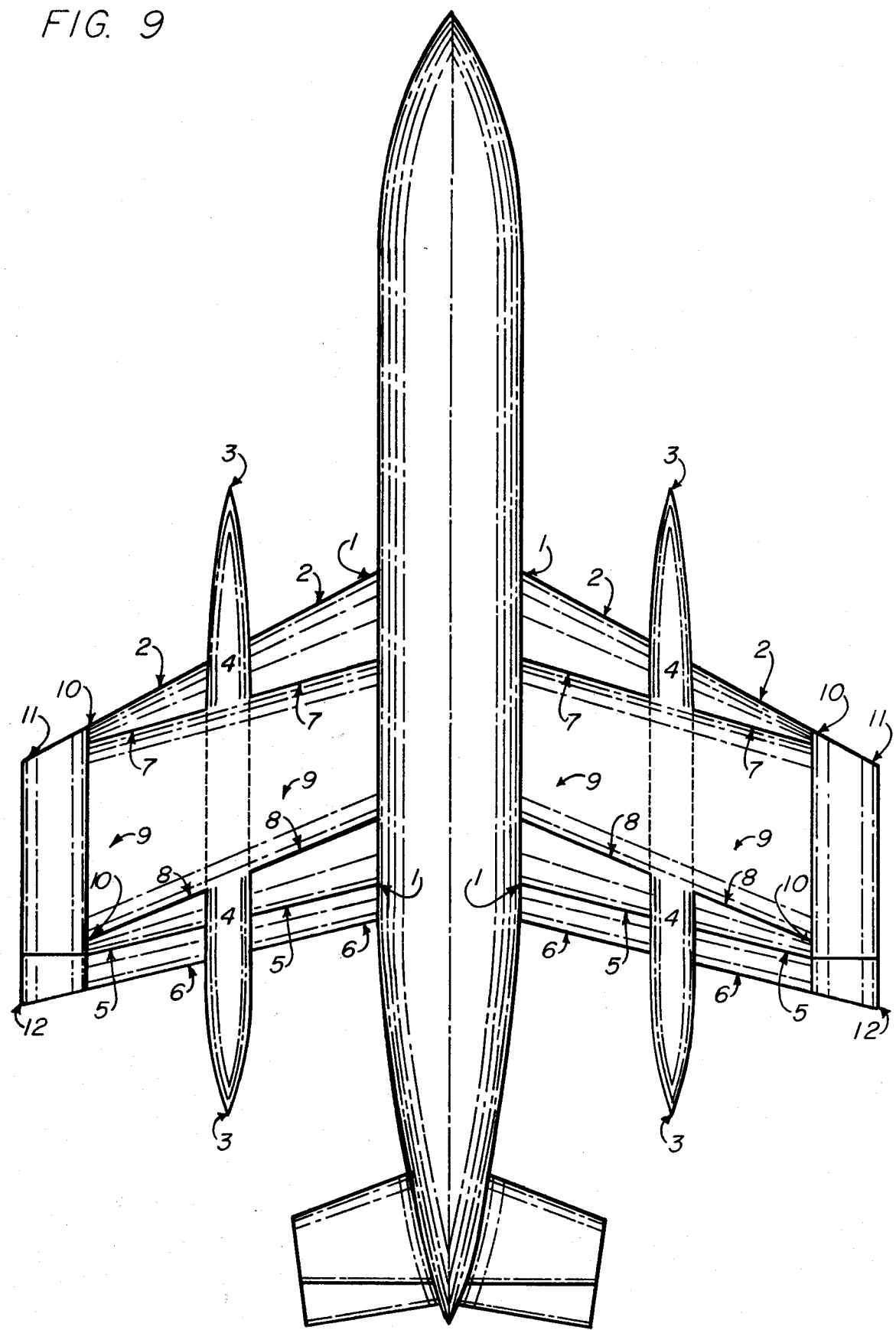
FIG. 9—Top view of the wings with the numbers that are used to identify the various parts of the wings.

FIG. 9—The operating mechanisms are located inside the fuselage 1 and the Nacelle 3. These are located in the Nacelle 3 at 4. They could be hydraulic or mechanical. It would probably be possible to use hydraulic but I would prefer mechanical.

The front shaded sections 2 are hinged at the back 7 to the top member 9 and swings down against the lower member 6 to make one high lift wing. In the cruise position 2 and 5 swings up to let the wind through and provides two very low lift wings.

The Nacelle 3, highly streamlined provides a compartment for the retracted landing gear, braces the top member 9 to the lower wing 6 and provides a place 4 for actuating linkage to open and close the moveable sections 2 and 5. The operating mechanisms for the rear moveable sections 5 can be concealed inside the fuselage 1 and Nacelle 3, also located in the Nacelle at 4.

There should be sufficient wing tip 11 to accomodate an aileron 12.

The upper member 2, 9, 5 and the lower member 6 converges and joins at 10.

The member 5 contacts the bottom wing 6 forward of its trailing edge.

The rear shaded sections 5 are hinged 8 at the front of the shaded areas to the top wings 9 and it 5 closes down against the top surface of the lower wing 6 to form one high lift wing. When open, 2, 9, 5, 6 forms two very low lift wings.

I claim:

1. An improvement in heavier-than-air aircraft having a fuselage and a tail assembly, the improvement being a variable wing design having two high speed airfoils on each side of the fuselage, comprising an upper airfoil spaced above a lower airfoil at their attachment to the fuselage and converging toward each other at a juncture near their wing tips to form a triangular shaped air passageway therebetween, each said upper airfoil having a leading edge section immediately above each air passageway, of proper size and shape and hinged at its rear edge to said upper airfoil such that when said leading edge section is pivoted downward it contacts the leading edge of said lower airfoil and closes off the air passageway forming a sloping upper surface to direct airflow up and over the upper airfoil; each of said upper airfoils also including a trailing edge section of proper size and shape and hinged at its front edge to said upper airfoil such that when said trailing edge section is pivoted downward it contacts the upper surface of said lower airfoil at a location forward of the trailing edge thereof closing the passageway and forming a downward sloping surface from said upper airfoil, consequently with said leading and trailing edge sections unpivoted the wing design is of two spaced apart wings for high speed flight and with the sections pivoted into their lower airfoil contacting positions a single high lift low speed wing is formed.

2. An improvement in heavier-than-air aircraft as set forth in claim 1 and further including a streamlined Nacelle position between each said upper and lower airfoils and dividing each said passageway into two passageways, said Nacelle providing added structural support for said airfoils and housing part of an actuating mechanism for said sections and a compartment for landing gear for said aircraft.

3. An improvement in heavier-than-air aircraft as set forth in any one of claims 1 or 2 wherein said each passageway between said upper and lower airfoils will be formed by canting the upper airfoil downward and the lower airfoil upward from the fuselage toward their juncture near the wingtip.

4. An improvement in heavier-than-air aircraft as set forth in any one of claims 1 or 2, wherein each said passageway between said upper and lower airfoils will be formed by canting only the upper airfoil downward from the fuselage toward its juncture with said lower airfoil near the wingtip.

5. An improvement in heavier-than-air aircraft as set forth in any one of claims 1 or 2 wherein each said passageway between said upper and lower airfoils will be formed by canting only said lower airfoil upward toward its juncture with said upper airfoil near the wing tips.

* * * * *